Nov. 4, 1947.   F. T. ROBERTS ET AL   2,430,081
METHOD OF MAKING FLEXIBLE TUBES
Filed April 13, 1943   4 Sheets-Sheet 1

INVENTORS:
Fred T. Roberts and Robert Eldon Roberts,
BY Bates, Teare & McKee
Attorneys.

Nov. 4, 1947.  F. T. ROBERTS ET AL  2,430,081
METHOD OF MAKING FLEXIBLE TUBES
Filed April 13, 1943  4 Sheets-Sheet 2

INVENTORS:
Fred T. Roberts and Robert Eldon Roberts,
BY Bates, Teary & McBean
Attorneys Nov. 4, 1947.  F. T. ROBERTS ET AL  2,430,081
METHOD OF MAKING FLEXIBLE TUBES
Filed April 13, 1943  4 Sheets-Sheet 3

INVENTORS
Fred T. Roberts and Robert Eldon Roberts,
BY
Davis, Team McBeau
Attorneys Nov. 4, 1947.    F. T. ROBERTS ET AL    2,430,081
METHOD OF MAKING FLEXIBLE TUBES
Filed April 13, 1943    4 Sheets-Sheet 4

INVENTORS:
Fred T. Roberts and Robert Eldon Roberts,
BY Bates, Teare McKelvey,
Attorneys.

Patented Nov. 4, 1947

2,430,081

UNITED STATES PATENT OFFICE 2,430,081

METHOD OF MAKING FLEXIBLE TUBES

Fred Thomas Roberts and Robert Eldon Roberts, Ridgefield, Conn.

Application April 13, 1943, Serial No. 482,872

19 Claims. (Cl. 154—8)

This invention relates to a method of making flexible non-collapsible tubes. The tube has an inwardly and outwardly corrugated flexible wall braced by means embedded in the wall and surrounding the bore of the tube to allow it to be axially stretched or compressed or flexed in any direction.

Our method is well adapted for producing the flexible, non-collapsible tube shown, described and claimed in the copending application of Mr. Fred T. Roberts, No. 481,407, filed April 1, 1943, which issued as Patent 2,396,059 on March 5, 1946. Such tube in its preferred form comprises an inner yielding impervious tubular sleeve, an embracing helical spring stretched from its normal condition but less than its elastic limit, so as to be further extendable or compressible, and means covering the successive turns of the spring and joining the inner wall to embed the spring. The wall between the successive turns of the spring is diverted inwardly to corrugate the tube, leaving the spring at the crests of the outer corrugations. The present invention provides a series of steps, the carrying out of which may efficiently form such a tube.

The invention is hereinafter fully described in connection with the drawings wherein the various views are arranged substantially in the order of the steps performed.

Figure 1:
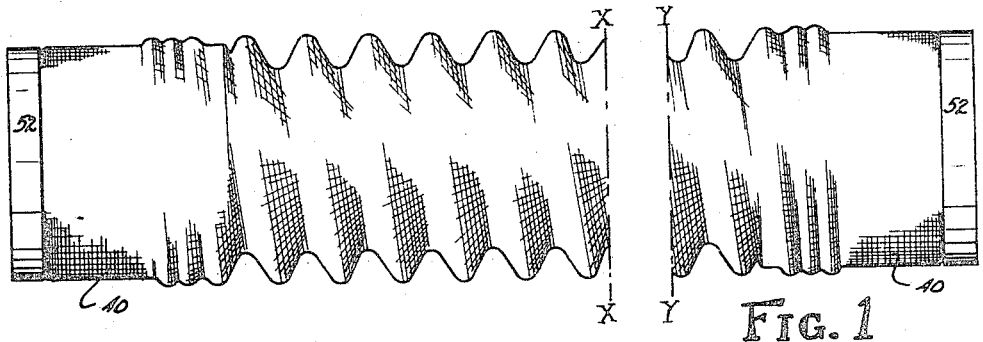
Figure 2:
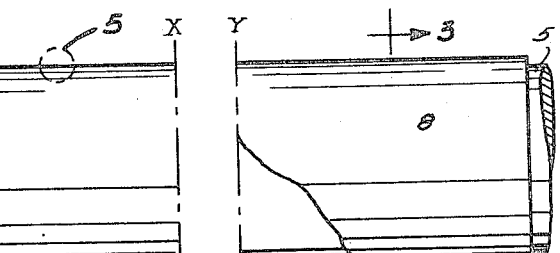
Figure 6:
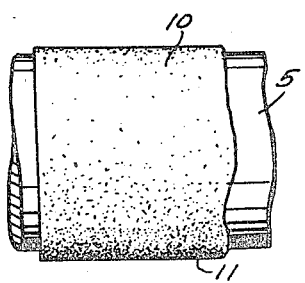
Figures 7, 8:
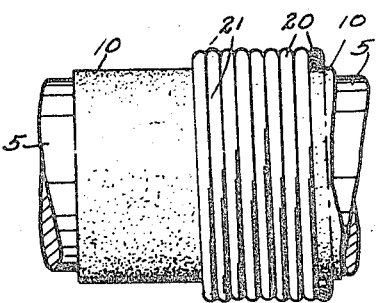
Figures 3, 4:
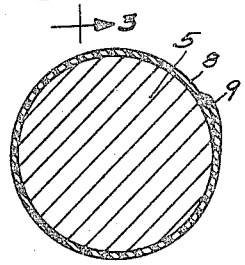
Figure 5:
Figure 9:
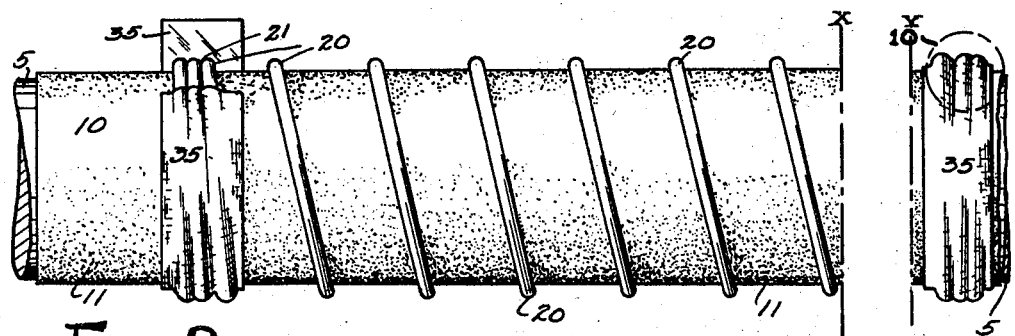
Figures 10, 12:
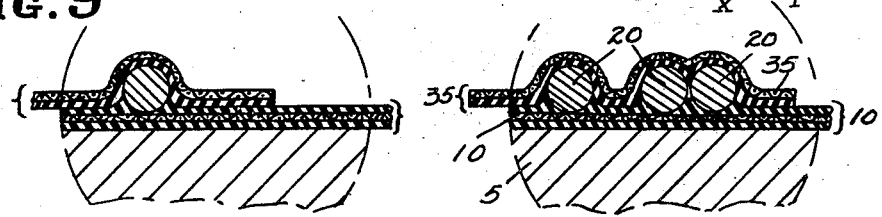
Figure 11:
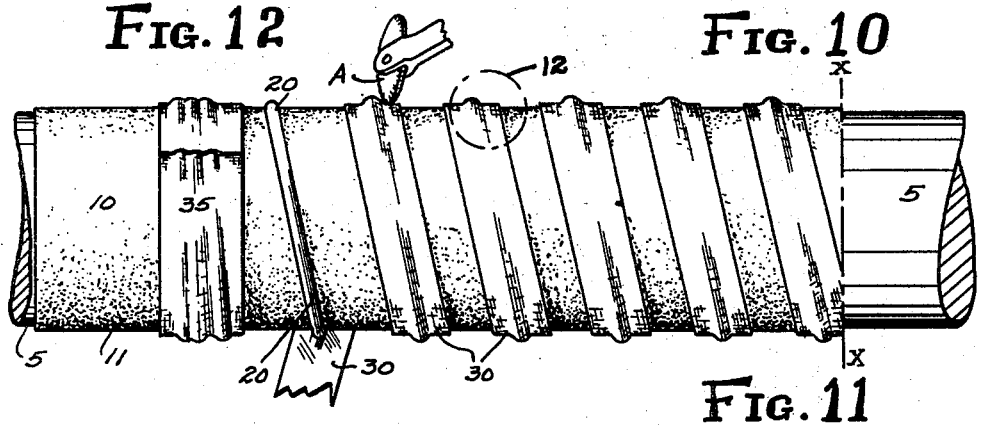
Figure 13:
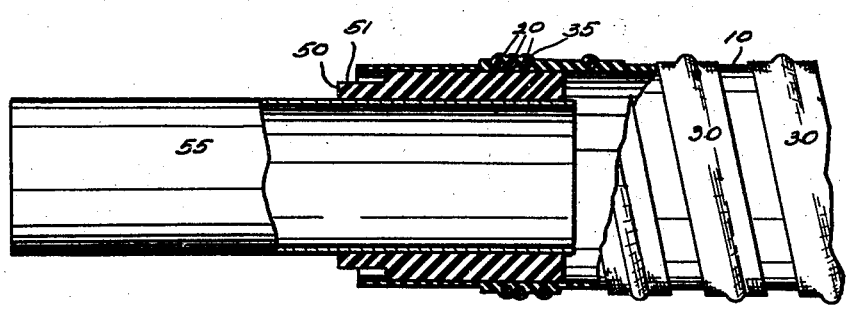
Figure 14:
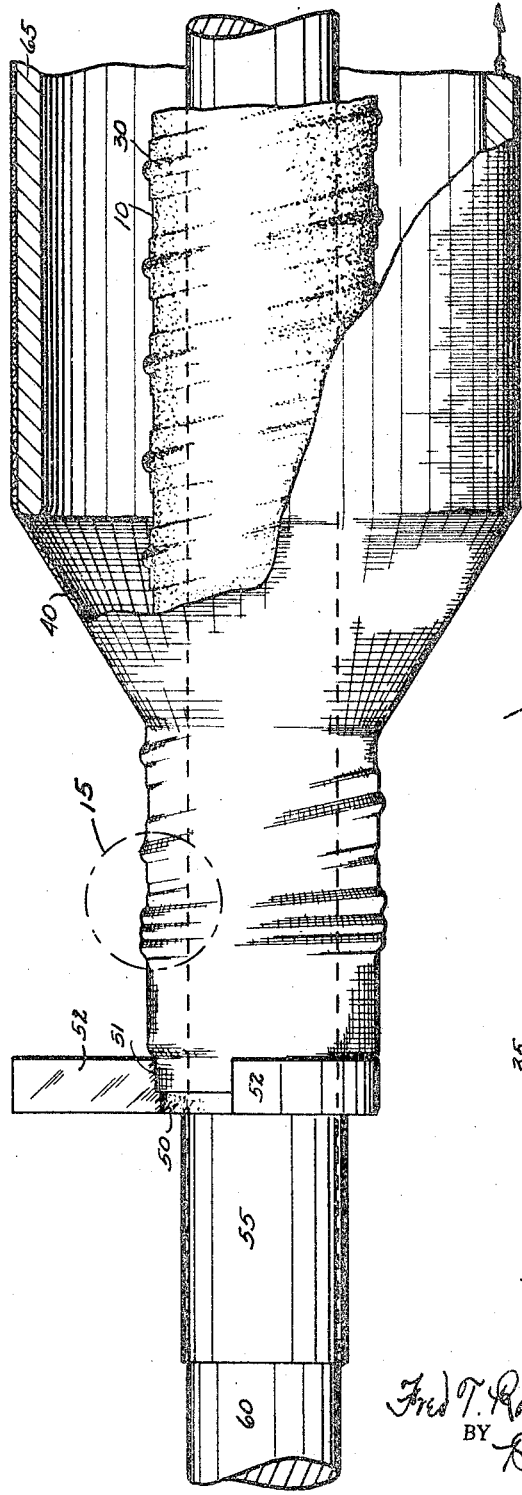
Figure 15:
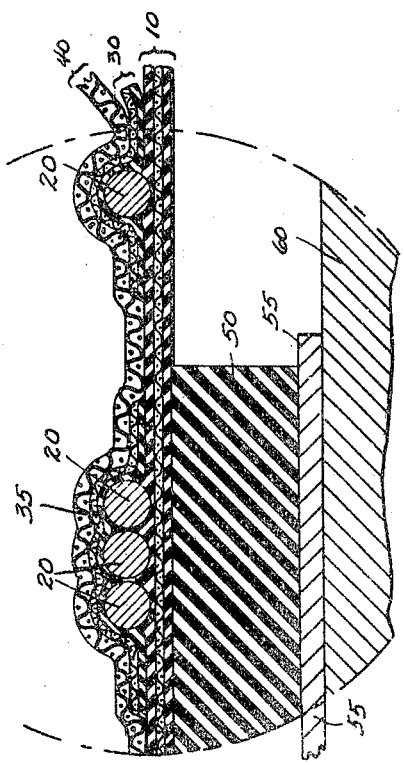
Figure 16:
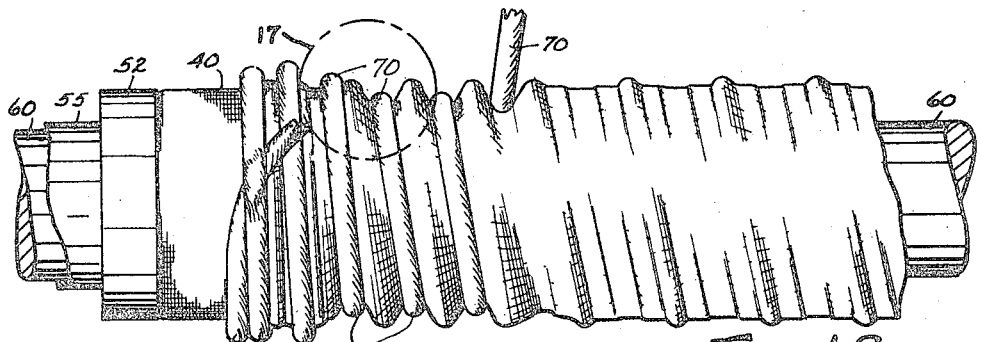
Figure 17:
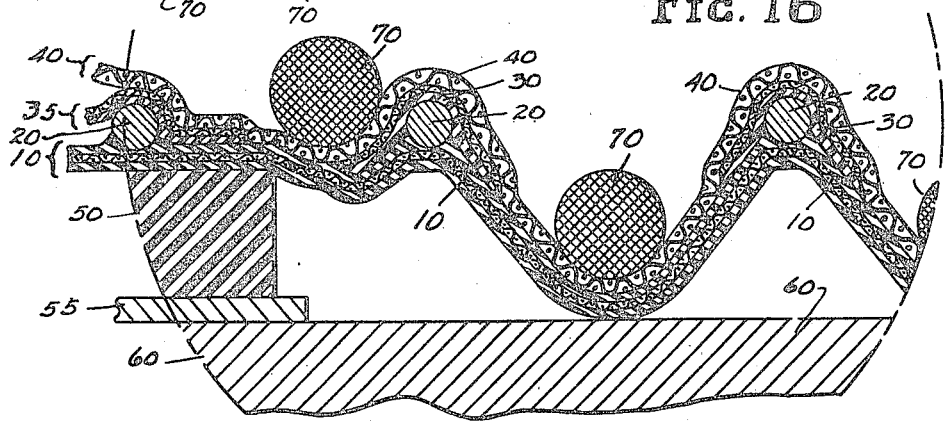
Figure 18:
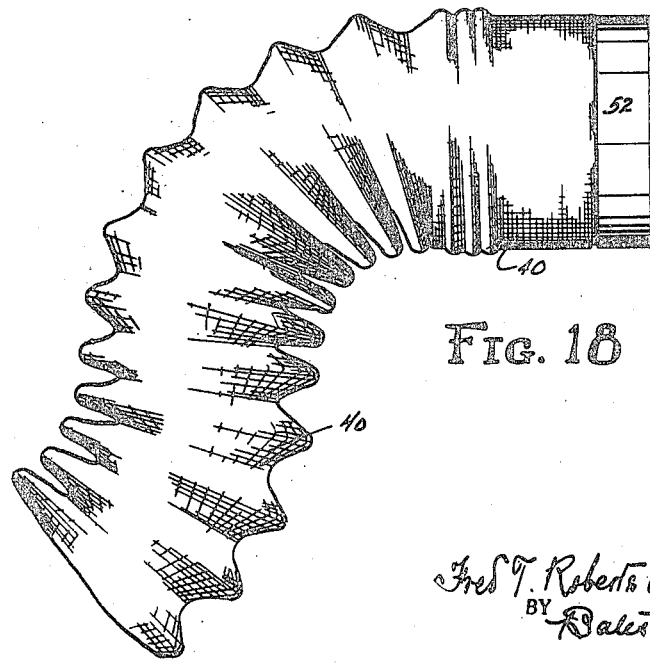

In the drawings, Fig. 1 is a side elevation of the finished tube with an intermediate portion of indefinite length broken out between the lines X—X and Y—Y; Fig. 2 is a side elevation of a mandrel on which a sheet of rubberized fabric has been mounted to form the inner sleeve of the tube, parts being broken out between corresponding lines X—X and Y—Y. Fig. 3 is a cross section on the line 3—3 on Fig. 2, showing the mounted material as having a lap seam; Fig. 4 is a similar view illustrating the tube after the lap regions have been pressed together to form a continuous tube and after such tube has been partially vulcanized; Fig. 5 is an enlarged fragmentary longitudinal section of a portion of the tube and mandrel, as indicated by the broken line circle 5 on Fig. 2; Fig. 6 is an elevation of the coiled metal spring in its normal or unapplied condition; Fig. 7 is a view illustrating the mandrel with the sleeve thereon and adhesive applied to the sleeve; Fig. 8 illustrates the same parts with the spring of Fig. 6 placed around the rubberized fabric and adhesive; Fig. 9 is a side elevation, with intermediate parts broken out, illustrating the same spring drawn out to a considerable length but less than its permissible length, the end portions of the spring being attached to the sleeve; Fig. 10 is an enlarged fragmentary longitudinal section in a region indicated by the broken line circle 10 on Fig. 9; Fig. 11 is a side elevation illustrating the application of adhesive tape wound helically over the successive turns of the metal spring, and caused to adhere to the rubberized sleeve; Fig. 12 is an enlarged fragmentary longitudinal section in a region indicated by the broken line circle 12 on Fig. 11; Fig. 13 is a sectional side elevation indicating the tube removed from the mandrel of Fig. 10 and mounted on a bushing which surrounds a tubular holder; Fig. 14 is a side elevation partly broken away, illustrating the tube of Fig. 13 surrounding a smaller mandrel than that shown in Figs. 2 to 11, such smaller mandrel being embraced by the tubular holder of Fig. 13, Fig. 14 illustrating the application of a fabric sheath to the exterior of the tube formed by the inner sleeve, the helical spring and the tape; Fig. 15 is an enlarged, exaggerated view in longitudinal section in the area indicated by the broken line circle 15 on Fig. 14; Fig. 16 is a side elevation illustrating the tube on the small mandrel of Fig. 14 showing the application of a helically wound cord pressing inward the regions between the successive turns of the tape and thus helically corrugating the tube; Fig. 17 is an enlarged fragmentary section in the region indicated by the broken line circle 17 on Fig. 16; Fig. 18 is a view of a portion of the finished tube illustrating its flexible, compressible and extendable characteristics.

In Figs. 2 to 12, inclusive, we have illustrated a cylindrical mandrel 5 on which the first step of the operation is performed. This step comprises embracing the mandrel by a tube 10, Fig. 4, of rubber or rubberized material. As there shown this may be a seamless tube, raw or partially vulcanized, drawn axially over the mandrel. However, we prefer to take a sheet of woven fabric 8 cut on the bias and thoroughly rubberized and having a width somewhat greater than the circumference of the mandrel, and wrap such sheet tightly around the mandrel to cause the longitudinal edges to overlap, as indicated at 9 in Fig. 3. The exterior overlapped edge is pressed down tight onto the under edge to unite the two and the joined sheet is then partially vulcanized to produce the complete sleeve, indicated at 10 in Fig. 4 and subsequent figures.

The next step in the method is to apply adhesive or rubber cement to the exterior of the sleeve 10, such adhesive being indicated by the stippled effect 11 in Fig. 7 and subsequent figures.

Fig. 6 illustrates a helically coiled wire spring 20 preferably of steel, in its normal or unapplied condition with the successive coils snugly against each other, and Fig. 8 shows this spring embracing the sleeve 10, the exterior of which carries the adhesive 11. The endmost two or three turns of the spring are preferably spot-welded together, as indicated at 21 in Fig. 8. A strip of tape 35 is wound in a course normal to the axis about such mounted endmost or welded coils, and a portion of the adjacent coil and the edges of the tape pressed down tightly to anchor that end of the spring tightly to the sleeve 10, as indicated in the left hand portion of Fig. 9.

Now the anchored spring is materially extended along the sleeve, as shown in Fig. 9, though not to the maximum permissible amount, and the far end of the spring (having its final coils welded to each other) is tightly secured to the sleeve on the mandrel by the wrapping tape 35, as shown in the right hand portion of Fig. 9.

The enlarged view, Fig. 10 illustrates the condition at the final anchorage of the spring where the two endmost turns and a portion of the third turn are surmounted by the tape 35, and the construction at the end of the spring first applied is similar. The tape 35 has a rubber inner face so that the surrounded turns of the spring are embedded between such tape and the rubberized fabric sleeve 10.

The axial length of the unapplied spring in Fig. 6 corresponds to the length of tube from the left hand end to the line XX in Figs. 1 and 2, and that this same length of spring is shown in its extended form from the anchorage of the tube to the line XX—Figs. 9 and 11. Now while the spring is thus extended and secured at its ends to the rubberized fabric sleeve and is held extended as shown in Fig. 9 (in which the stipple effect indicates cement), a course of rubber faced tape 30 is wound spirally along the wire and the overhanging edges of the tape are then pressed firmly onto the adhesive-carrying sleeve. Such pressing may be effected by cloth strips drawn tightly over the tape, or by the application of a roller indicated in Fig. 11 at A. When thus firmly pressed the parts are given partial additional vulcanization to bind the tapes firmly to the inner sleeve.

The tube comprising the inner sleeve, the extended coil spring and the binding tape is now removed from the mandrel 5 and smooth bore bushings 50 are mounted within the opposite ends of the tube, being cemented thereto.

A portion of the bushing extends within the anchored end of the spring as shown in Fig. 13, with the remainder of the bushing projecting beyond such end so that it may be embraced by the final sheath hereinafter described.

For convenience the bushing 50 may be previously mounted on the exterior of a tubular holder 55, Fig. 13, which serves to place the bushing in the end of the tube and enables the tube to be pressed down firmly on the exterior of the bushing which has been covered with cement so that the tube and bushing are firmly united. A similar treatment at the other end of the tube completes this particular step.

The tube with the inserted bushings and their holders 55 is now mounted on a mandrel 60 shown in Figs. 14 to 17, the tubes being in an extended condition thereon.

The next step comprises covering the entire exterior of the tube so far produced with adhesive and then mounting a fabric sheath thereon. This sheath 40 is shown as comprising endless tube of readily stretchable stockinet or similar material. It is drawn over the complete tube mounted on the small mandrel 60.

It is a convenience to place the stockinet tube first in laterally stretched form on a comparatively large tubular holder 65 which may freely surround the mounted tube being produced. The portion of the stockinet overhanging the end of such hollow holder is pressed down at its end onto the projecting portion of the bushing at that end of the tube and attached thereto. Preferably the bushing is rabbeted at its outer end as indicated at 51 and the stockinet sheath is pressed down into the space thus provided and surmounted by a piece of rubber formed into an annulus as indicated at 52 in Fig. 1. Now the tubular holder 65 is withdrawn toward the right, Fig. 14, resulting in the stockinet tube contracting into close engagement with the exterior of the spirally wound tape 30 and the exterior of the inner sleeve 10 between the successive turns of the tape.

Now follows the step of pressing the stockinet and inner sleeve inwardly between successive turns of the spring and spiral tape to corrugate the tube. This is readily effected by winding a chalk covered cord 70 forcibly about the sheathed tube in the spaces between the spring turns to bring the interior face of the sleeve 10 down into engagement with the mandrel 60. This operation produces free inward corrugations bounding the mandrel, but leaves the outer corrugations retained in their original diameter by means of their adherence to the turns of the spring which thus stand at the crests of the corrugations.

The final step in completing the operation is to vulcanize the corrugated tube on the mandrel 60 while its corrugations are retained in place by the cord 70. The various preceding vulcanizations have all been partial, so that this final vulcanization not only binds each part to its neighbor but gives to the various rubber or rubberized portions the proper amount of final vulcanization. After this vulcanization the chalked cord 70 is unwound and the finished tube removed from the mandrel 60, and the bushing-holders 55 removed.

The finished tube when in straight condition is as illustrated in Fig. 1. It may be compressed or extended axially or flexed laterally in any direction. Fig. 18 illustrates a reverse flexing which causes an extension of the tube on the convex side and a compression on the concave side of the curved course of the tube. No matter what the flexure or extension or compression of the tube, it is non-collapsible by reason of the inserted spring and always retains an ample available bore within the tube. The diameter of the final mandrel is only slightly less than the internal diameter of the bushings, so that when the bushings are mounted on whatever conduits it is desired to connect by the tube the minimum bore through the inner corrugations is at least as great and ordinarily greater than that of such conduits. Accordingly, an effective passageway is maintained by the tube at all times.

If desired, we can eliminate the tape, in making some tubes, by simply holding the spring on the inner sleeve, which in this case is rubber well cemented on the outside (as indicated by the stippling 11 in Fig. 9), and drawing regular stockinet over the whole surface, then covering that with thin raw rubber and binding it down against the mandrel in the manner shown in Fig. 16 and giving it a preliminary vulcanization and then withdrawing it. If a strong enough spring is used it will draw back, automatically corrugating the tube. If the spring is not strong enough, we need simply wrap the tube down with the cord on the smaller mandrel.

We have made all rubber tubes by first using an all rubber inner sleeve, then cementing either raw rubber strip or partially-cured rubber strip (like the tape 30, Fig. 11) over the spring convolutions and then cementing the whole surface and pulling over that surface a thin rubber tube and then binding it all down and giving it a slight further cure on the large mandrel, removing it and giving a final cure with cord forming the depressed convolutions. We have also found we can use a spring made of semi-hard rubber or of plastic material.

In summary we may note that the inner sleeve may be either rubberized fabric, or all rubber compound, or a plastic such as ethyl cellulose or other substance, if it is flexible and has a surface to which another layer of compound will adhere; the spring may be of hard rubber, plastic or metal. An important point of the invention is attaching a spring in an extended position to a wall of a sleeve, and then allowing the spring to relax to a position allowed by the material of the sleeve. The thickness of the sleeve and the rigidity of the material governs the natural comeback of the spring. The curing on a smaller mandrel fixes this come-back. The sleeve may be a piece of all-rubber compound. The tape holding the spring to the sleeve may be all-rubber compound run on a tubing machine of the exact size and shape desired and be completely vulcanized and attached over the spring to the sleeve by air curing cement. The outer sleeve taking the place of stockinet, may be a thin tube of all rubber compound fully cured. It may be stretched over a thin metal tube just large enough to go over the rubber covered spring and tube and be fed by the withdrawal of such metal tube after the manner of feeding the stockinet illustrated in Fig. 14. This tube may be vulcanized on a mandrel slightly smaller in diameter than the overall diameter of the rubber covered spring so that when fed onto that which has been well cemented with air curing cement, it will bind tight down against it and, after being wrapped for a while with cloth or tape, will be firmly attached and the structure be firmly vulcanized together. When removed from the mandrel, the comeback of the spring and the binding of the outer rubber tubing will cause the tube to become accordion pleated.

While any of the above noted features may be employed, we prefer to build the inner wall of rubberized fabric, or of all rubber or rubber-like plastic; to slightly vulcanize it; to attach the spring with rubberized fabric tape cut on the bias; to give an additional vulcanizing to firmly vulcanize the tape to the tube and hold the spring; to cement and then cover with stockinet and fix the corrugations by binding down with a sash cord against a smaller mandrel. We have actually made tubes, with semi-hard rubber spring, plastic springs, a rubber sleeve, rubber strips over the spring, and a rubber sheath. We have set the corrugations with a cure on a smaller rod and sometimes using no rod, simply using the sash cord separating the convolutions.

We claim:

1. The method of making a flexible tube comprising taking a sleeve of rubberized fabric, securing to the exterior of the same the endmost coil of a helical wire spring surrounding the sleeve, stretching the spring in the direction of the length of the sleeve to separate its successive coils and securing the distant end of the spring to the sleeve, surmounting the spring with spirally wound adhesive tape binding it to the sleeve, thereafter pressing inwardly the helical regions of the sleeve between edges of adjacent turns of tape, and vulcanizing the product.

2. The method of making a flexible tube comprising taking a flexible sleeve, placing about the sleeve and securing to it a helical spring with its adjacent coils spaced apart, mounting the sleeve with its attached spring about a mandrel spaced from the interior of the sleeve and pressing inwardly against the mandrel the helical regions of the sleeve between adjacent turns of the spring.

3. The method of making a flexible tube comprising placing a sleeve of vulcanizable material about a mandrel, locating a helical spring with its coils separated about the exterior of the sleeve, winding an adhesive tape spirally over the wire coils and causing the edges of the tape to adhere to the sleeve, transferring such partially formed tube to a smaller mandrel, pressing the annular spaces of the sleeve between successive turns of the spring inwardly against said smaller mandrel to corrugate the tube, and vulcanizing the tube in its corrugated condition.

4. The method of making a flexible tube comprising mounting on a cylindrical mandrel a sleeve of flexible rubberized fabric, mounting on the exterior of such sleeve a helical wire spring with its coils stretched apart less than the elastic limit, anchoring the ends of the stretched spring to the sleeve, surmounting the helical coils of the spring by adhesive tape wound spirally and having its edges pressed against and adhering to the sleeve, transferring such partially formed tube to a smaller mandrel, pressing inwardly against the smaller mandrel the helical spaces between the successive wire turns, and vulcanizing the finished product.

5. The method of making a flexible non-collapsible tube comprising mounting a stretched helical spring on a flexible sleeve, causing successive turns of the spring to be individually attached to the sleeve, placing bushings in the two ends of the tube thus formed, mounting the tube with its bushings on a mandrel spaced from the sleeve between the bushing, pressing inwardly the helical region between adjacent turns of the spring.

6. The method of making a flexible tube comprising mounting a sleeve of vulcanizable flexible material on a cylindrical mandrel, placing about the exterior of the sleeve a stretched helical wire spring, anchoring the two ends of the spring respectively to the sleeve, covering the spring with spirally wound adhesive tape adhering to the sleeve, removing such partially formed tube from the mandrel, placing bushings in the ends of the tube, mounting it on a mandrel of less diameter than the first mandrel, pressing inwardly against the smaller mandrel, the helical regions of the sleeve between successive turns of the spring, and thereafter vulcanizing the product.

7. The method of making a flexible tube comprising taking a sleeve of flexible vulcanizable material, placing a helical spring about the sleeve, anchoring one end of the spring to the sleeve, stretching the spring in the direction of the axis of the helix from its normal collapsed condition but less than its elastic limit, anchoring the other end of the spring to the sleeve, surmounting the spring by a spirally wound course of adhesive tape, placing a tubular sheath over the sleeve, spring and tape, pressing inwardly the helical regions of the sheath and sleeve between adjacent turns of the spring to corrugate the tube, and vulcanizing it in its corrugated condition.

8. The method of making a flexible tube comprising mounting a sleeve of flexible material about a cylindrical mandrel, placing a helical spring about the sleeve, anchoring one end of the spring to the sleeve, stretching the spring from its normal collapsed condition by less than its elastic limit, anchoring the outer end of the spring to the sleeve, surmounting the spring by a spirally wound strip of adhesive tape, surmounting the parts by a tubular sheath, then transferring the tube so far formed to a smaller mandrel and holding it spaced from the exterior of the mandrel, pressing inwardly the helical regions of the sheath and sleeve between adjacent turns of the spring to corrugate the tube.

9. The method of making a flexible, non-collapsible tube comprising forming an inner tubular sleeve of vulcanizable material, mounting on the exterior thereof a helical wire spring, stretching said spring longitudinally of the sleeve, attaching the ends of the spring to the sleeve, winding a helical course of adhesive tape about the stretched spring, pressing the edges of such tape against the sleeve to cause them to adhere thereto, placing a tube of stockinet over the sleeve, spring and tape, pressing inwardly the helical regions of the sheath and sleeve to corrugate the same between adjacent turns of the spring, and thereafter vulcanizing the product while in its corrugated condition.

10. The method of making a flexible tube comprising mounting on a cylindrical mandrel a sleeve of rubber impregnated fabric, placing adhesive on the exterior of the sleeve, mounting a stretched helically wound metal wire spring on the exterior of the sleeve, placing an annular course of adhesive tape about the endmost coils of the stretched spring to anchor it to the sleeve, winding an adhesive tape spirally about the different turns of the stretched spring, transferring the tube so far formed to a smaller mandrel, covering such partially formed tube with a sheath of stockinet and pressing the stockinet and sleeve inwardly against said smaller mandrel in a helical region between successive turns of the spring to corrugate the tube, and vulcanizing the product.

11. The method of making a flexible tube comprising mounting a sleeve of rubber impregnated fabric on a cylindrical mandrel, placing about the sleeve a helically wound wire spring, anchoring one end of the spring to the sleeve, stretching the spring less than its elastic limit and anchoring the other end of the spring to the sleeve with the coils of the spring separated, surmounting the spring by spirally wound adhesive tape, pressing the edges of the tape inwardly to cause them to adhere to the sleeve which is supported by the mandrel, removing the tube so far formed from the mandrel, placing bushings within the end portions of the sleeve, mounting the bushings on a smaller mandrel which extends through the sleeve and is out of contact with the intermediate region thereof, drawing a tube of stockinet over the exterior of the sleeve and cementing it thereto, pressing inwardly the helical regions of the stockinet and sleeve against the mandrel between adjacent turns of the spring to corrugate the tube, and thereafter vulcanizing the tube as a unit in its corrugated condition.

12. The method of making a corrugated flexible tube comprising taking a sleeve of flexible material, securing about it a helical spring, thereafter stretching the spring longitudinally of the sleeve, the successive turns of the spring being thus spaced apart and the spring applying tension to the sleeve, pressing the sleeve inwardly between successive turns of the spring to corrugate the tube, and treating the corrugated tube to make a unitary structure.

13. The method of making a corrugated flexible tube comprising taking a sleeve of rubberized flexible material, placing about it a previously wound helical metal spring, thereafter stretching the spring to cause the successive turns of the spring to be spaced apart longitudinally of the helix beyond the unapplied position of rest of the spring, binding such successive turns to the sleeve by a spirally wound tape surmounting said turns and adhering at its edges to the sleeve, diverting the sleeve inwardly in a helical course between said successive turns, and vulcanizing the product.

14. The method of making a flexible tube comprising taking a flexible sleeve, securing to the exterior of the sleeve the endmost coil of a helical wire spring surrounding the sleeve, thereafter stretching the spring in the direction the length of the sleeve to separate the successive coils of the spring, then securing the distant end of the spring to the sleeve, and thereafter pressing inwardly the helical regions of the sleeve between adjacent turns of the spring.

15. The method of making a flexible tube comprising taking a sleeve of yielding impervious material, securing to the exterior of the sleeve the endmost coil of a helical spring surrounding the sleeve, stretching the spring in a direction of the length of the sleeve so that its coils are separated, securing the distant end of the spring to the sleeve, surmounting the spring with spirally wound adhesive tape the edges of which adhere to the sleeve, pressing inwardly the helical regions of the sleeve between adjacent turns of the spring to corrugate the tube, and vulcanizing the product while in its corrugated condition.

16. The method of making a flexible tube comprising mounting a previously coiled helical spring on the exterior of a flexible sleeve, stretching the spring in the direction of the axis of the helix, binding successive turns of the spring individually to the sleeve while the spring is held in stretched condition, surmounting the parts mentioned with a flexible sheath, pressing the sheath and spring inwardly in helical regions between successive turns of the spring, while allowing the spring to contract, and subsequently treating the tube to bind the parts together while the spring is still stretched from its original condition but less than to its elastic limit.

17. The method of making a corrugated reinforced flexible tube collapsible and extendable axially and flexible laterally, comprising taking a closely wound resilient helical reinforcing member, stretching the same axially of the helix to less than the elastic limit thereof, embedding the same in its stretched condition between an inner impervious yielding tubular member and an outer protecting member, and corrugating the tube to cause the spaced coils of the spring to lie within the outer crests of the corrugation while the inner crests of the corrugations are free to move outwardly.

18. The method of making a flexible tube comprising taking a helical spring, stretching the same axially of the helix and holding it stretched, securing a sheath over the spring in its stretched condition, corrugating the tube while allowing the stretched spring to contract toward its original position by pressing the sheath inwardly between coils of the spring to a greater distance than the thickness of the spring so that the sheath becomes corrugated inwardly of the spring and the spring becomes embedded in the outer crests of the corrugations while the inner crests of the corrugations are left free to expand outwardly.

19. The method of making a flexible tube comprising taking a helical spring, stretching the same axially of the helix, placing an outer tubular layer over the spring, securing the spring in its stretched condition to such outer layer, corrugating the tube while allowing the stretched spring to contract toward its original position by pressing inwardly between coils of the spring to a greater distance than the thickness of the spring so that the outer layer becomes corrugated inwardly of the spring and the spring becomes embedded in the outer crests of the corrugations, and providing an impervious inner layer covering the spring on the inner side without preventing the free outward expansion of the inward corrugations.

FRED THOMAS ROBERTS.
ROBERT ELDON ROBERTS.

REFERENCES CITED

The following references are of record in the file of this patent:

UNITED STATES PATENTS

| Number | Name | Date |
|---|---|---|
| 2,186,440 | Williams | Jan. 9, 1940 |
| 1,797,193 | Kimmich | Mar. 17, 1931 |
| 2,176,762 | Forbes | Oct. 17, 1939 |
| 713,560 | Dodge | Nov. 11, 1902 |
| 1,909,890 | Phillips | May 16, 1933 |
| 1,052,106 | Voorhees | Feb. 4, 1913 |
| 1,478,083 | Whitmarsh | Dec. 18, 1923 |
| 1,659,120 | Poberejsky | Feb. 14, 1928 |
| 2,321,064 | Broedling | June 8, 1943 |
| 1,576,767 | Loomis et al. | Mar. 16, 1926 |
| 2,245,758 | Chernack | June 17, 1941 |

FOREIGN PATENTS

| Number | Country | Date |
|---|---|---|
| 649,351 | France | Aug. 27, 1928 |
| 216,606 | Germany | Nov. 25, 1909 |